(12) United States Patent
Adeline et al.

(10) Patent No.: US 8,151,992 B2
(45) Date of Patent: Apr. 10, 2012

(54) RECEPTACLE PARTICULARLY FOR SOLID OR PASTY PRODUCTS, ITS METHOD OF MANUFACTURE AND PACKAGING COMPRISING THIS RECEPTACLE AND A CONTAINER RECEIVING SAME

(75) Inventors: Laurence Adeline, Agonac (FR); Marc Hinojosa, Coursac (FR)

(73) Assignee: Bongrain SA, Viroflay (FR)

( * ) Notice: Subject to any disclaimer, the term of this patent is extended or adjusted under 35 U.S.C. 154(b) by 0 days.

(21) Appl. No.: 12/707,472

(22) Filed: Feb. 17, 2010

(65) Prior Publication Data
US 2010/0206763 A1   Aug. 19, 2010

(30) Foreign Application Priority Data

Feb. 19, 2009   (FR) ...................................... 09 00761

(51) Int. Cl.
*A45C 11/20* (2006.01)
(52) U.S. Cl. ...................... 206/551; 426/128; 220/23.83
(58) Field of Classification Search .................. 206/551, 206/484, 484.1, 484.2, 825, 524.2; 426/106, 426/128; 220/23.83, 23.87, 23.9
See application file for complete search history.

(56) References Cited

U.S. PATENT DOCUMENTS

| | | | | |
|---|---|---|---|---|
| 2,698,249 | A * | 12/1954 | Fisher | 426/411 |
| 5,564,256 | A | 10/1996 | Weder | |
| 7,563,495 | B2 * | 7/2009 | Anelli | 428/34.6 |

FOREIGN PATENT DOCUMENTS

| | | |
|---|---|---|
| EP | 0234139 | 9/1987 |
| FR | 2589436 | 5/1987 |
| FR | 2854880 | 11/2004 |
| WO | WO 2004/099033 | 11/2004 |

* cited by examiner

*Primary Examiner* — Jacob K Ackun
(74) *Attorney, Agent, or Firm* — Morgan, Lewis & Bockius LLP

(57) ABSTRACT

The invention relates to a receptacle particularly for solid or pasty products, its method of manufacture and a packaging for such a product comprising a receptacle supporting it and a container removably receiving this receptacle. The invention applies to the packaging of all solid or semi-solid products and in particular to food products such as unripened cheeses or cheese specialties.

Figure 1:
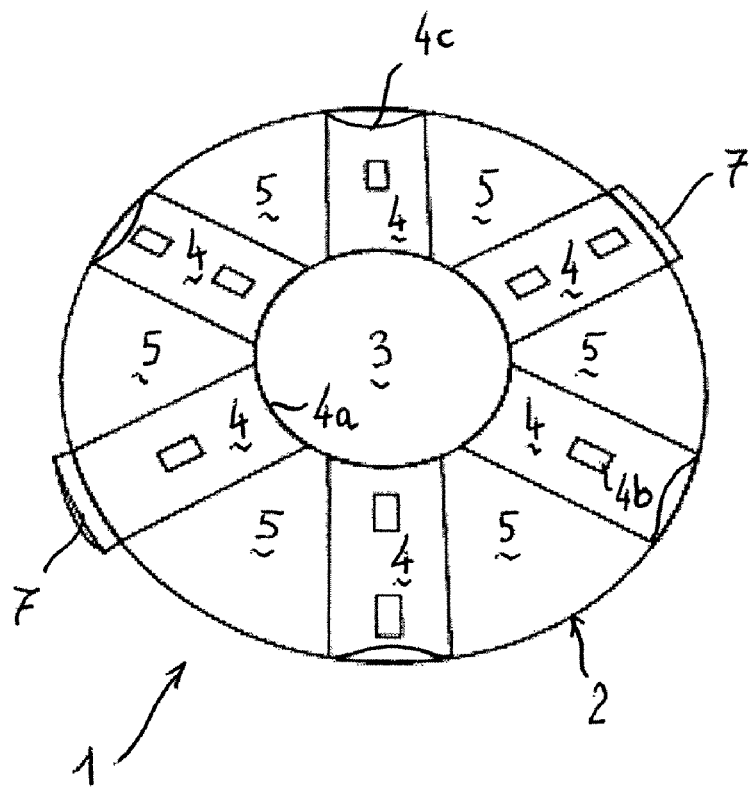

This receptacle (1) has a bottom (3) and a side wall (8) which extends from the bottom and which incorporates rigid wall retention means (4) capable of keeping it in an upright position relative to the bottom, these retention means being spaced over the periphery of the wall while being connected together in twos by flexible means (5) for unfolding/uplifting the wall which are formed by determined zones of at least one flexible film (2) and which are capable of allowing the reversible transition of the wall from its upright position to a folded-down position in which it extends the bottom in a more fanned-out manner.

According to the invention, these retention means are secured to these unfolding/uplifting means by overmolding, at least one rigid thermoplastic material forming these retention means and optionally this bottom being injected onto this flexible film.

10 Claims, 3 Drawing Sheets

RECEPTACLE PARTICULARLY FOR SOLID OR PASTY PRODUCTS, ITS METHOD OF MANUFACTURE AND PACKAGING COMPRISING THIS RECEPTACLE AND A CONTAINER RECEIVING SAME

RELATED APPLICATIONS

The present application is a U.S. Utility Patent Application, which claims priority to French Patent Application No. 0900761 (filed Feb. 19, 2009), which is hereby incorporated by reference in its entirety.

The present invention relates to a receptacle particularly for solid or pasty products, its method of manufacture and a packaging for such a product comprising a receptacle supporting it and a container removably receiving this receptacle. In general, the invention applies to the packaging of all solid of semi-solid products and in particular to food products such as unripened cheeses or cheese specialties, as an example and not in a limiting manner.

It has, for a long time, been known practice to package food products in flexible receptacles supporting them that are for example made of paper, as described in document U.S. Pat. No. 6,089,446 which relates to a cake is receptacle. This receptacle has a bottom and a side wall with bellows provided with means for stiffening it which extend in a continuous manner over the whole periphery of this wall, the bellows included, for the purpose of keeping it in the upright position opposing the unfolding of the receptacle.

A major drawback of this type of receptacle is that it does not allow easy access to its content for the consumer who would like, for example, to conveniently cut into the product that it contains, because its side wall cannot be folded down in line with its bottom.

An object of the present invention is to propose a receptacle particularly for solid or pasty products which remedies this drawback, this receptacle having a bottom and a side wall which extends from the bottom and which incorporates rigid wall retention means capable of keeping it in an upright position relative to the bottom, these retention means being spaced over the periphery of the wall while being connected together in twos by flexible means for unfolding/uplifting this wall which are formed by determined zones of at least one flexible film and which are capable of allowing the reversible transition of this wall from its upright position to a folded-down position in which it extends the bottom in a more fanned-out manner, Accordingly, a receptacle according to the invention is such that these retention means are secured to these unfolding/uplifting means by overmolding, at least one rigid thermoplastic material forming these retention means and optionally this bottom being injected onto this flexible film.

"Receptacle" in the present description means any hollow utensil capable of containing the aforementioned products, whether this receptacle is used to support these products (i.e. with its bottom facing downward) or to surround them like a cloche upside-down (i.e. with its bottom facing up then defining the top of the receptacle).

It will be noted that these rigid retention means make it possible to give the receptacle of the invention a self-supporting character in its upright position (i.e. raised or folded up), by stiffening its side wall in order to maintain the substantially right or slightly obtuse angle that it forms with the bottom of the receptacle.

As for the flexible unfolding/uplifting means, they therefore interact with these retention means for the reversible achievement of this folded-down position (i.e. deployed, flat or slightly raised relative to the bottom) allowing convenient access for the consumer to the product for the purpose of cutting it while protecting this product by preventing it from falling out of the receptacle via these rigid retention means. Specifically, the latter also make it possible to keep the side wall in its folded-down and opened-out position, opposing the total collapse of this wall particularly when the consumer holds the receptacle thus opened out in his hand.

In the case of a receptacle used in the upside-down position like a cloche, this receptacle then interacting optionally with a plate or base in order to contain the product, it will be noted that achieving the folded-down position by the flexible unfolding/uplifting means may allow the consumer to access the product from the side, by moving said side wall away and upward substantially in line with said bottom, and then to recover this product by folding down this side wall into the upright position of the latter. Specifically, in the case of a product such as cheese, it is possible to note that such a cloche could also be adapted to perform a function of refining this product.

It will also be noted that this receptacle can easily be folded up into its upright position after each usage, by virtue of said flexible unfolding/uplifting means, and remain stable in this position with no other external receptacle or container holding it there.

It will also be noted that the side wall of the receptacle could be extended upward by one or more flap(s) or at least closing it partially in the manner of a lid, so that the product is not only supported but also enveloped by the receptacle in a sealed or unsealed manner.

According to another feature of the invention, said retention means may be formed by a multitude of rigid laths extending over the periphery of said side wall in alternation with said unfolding/uplifting means, and said at least one flexible film extends between two adjacent laths in contact with said bottom and defines a free edge of this wall in alternation with the free ends of these laths.

"Laths", in the present description, means branches or lugs that are identical or different from one another, which have an elongated contour (for example rectangular but being able to be any other shape) and a surface that may be flat or curved (for example rounded or bent in the direction of their height and/or their width). These laths could therefore have heights, widths or thicknesses that differ from one another, with thicknesses of laths varying for example from 0.3 mm to several mm.

Advantageously, said unfolding/uplifting means may be attached to said adjacent laths forming bellows which are folded inward into said upright position, in which the laths are substantially touching, and which are deployed outward into said folded-down position, in which the laths are spaced out from one another.

As a variant of these bellows, said unfolding/uplifting means could be mounted movably in slots arranged in these adjacent laths, being capable of passing from said upright position in which they are partly retracted into the laths, to said folded-down position in which they are partly extracted from these laths.

According to another feature of the invention, said unfolding/uplifting means may be formed of said flexible film, preferably made of paper, cloth, nonwoven or of deformable thermoplastic material, which can be folded reversibly between two adjacent laths and which extends over the whole periphery of said side wall being secured at regular intervals to these laths. Advantageously, the flexible film may be secured to the respective inner faces of these laths, which may be, for certain of them or for each of them, articulated on said bottom or else separated from the latter by this flexible film. In the latter case, this flexible film could itself fulfill the function of hinge by being articulated on the bottom.

Also advantageously, each of these laths may have a bottom base articulated on said bottom at its peripheral edge via an articulation centered on this base, said flexible film extending on either side of each articulation in contact with this bottom and with each lath.

Preferably, both this bottom and these laths are formed of one and the same rigid thermoplastic material injected for the aforementioned overmolding, such as a polystyrene or a polypropylene for example. It will be noted however that the bottom could be made of another semirigid or even flexible material without departing from the context of the invention.

According to another feature of the invention, this receptacle may advantageously comprise gripping means which are formed by the respective free ends of at least two, preferably opposite, of said laths on the periphery of said wall. These gripping means may for example form handles or be connected together to form one or more loop(s) that are more or less arched, in the manner of a basket.

As an example and in no way limiting, said bottom may have a circular or square geometry, so that this receptacle has substantially a shape of an open corolla in said folded-down position. However, elliptical, oval, polygonal (for example square) or other geometries can also be envisaged for this bottom.

A packaging according to the invention for a solid or pasty food product, such as an unripened cheese or a cheese specialty, comprises a receptacle supporting this product as defined above and a rigid container for example of the pot type receiving this receptacle in a removable manner, so that the side wall of the receptacle substantially matches the shape of the side wall of the container in said upright position, this receptacle preferably being made of porous and/or perforated materials for the purpose of allowing the product to drain inside the container.

Advantageously, said retention means may be formed by said perforated rigid laths extending over the periphery of said side wall in alternation with said unfolding/uplifting means, which may be formed by at least one porous flexible film extending over the whole periphery of said bottom being secured at regular intervals to said laths.

It will be noted that said gripping means formed in a single piece with these rigid means for retaining the receptacle make it possible to easily extract the latter from the container in order to handle it or consume its content.

It will also be noted that this container receiving the receptacle provided with the product can be provided with a sealed or unsealed closure member, such as a lid mounted removably on the upper rim of the container.

A manufacturing method according to the invention of a receptacle as defined above comprises an overmolding of said flexible unfolding/uplifting means by said rigid retention means, this overmolding preferably being carried out by:

a) placing on the bottom of a mold a flexible film, preferably made of paper, cloth, nonwoven or of deformable thermoplastic material, which is designed to locally form said unfolding/uplifting means, b) injecting onto this film at least one rigid thermoplastic material designed to form both said bottom and said retention means, in order to make this film closely adhere to this bottom and to these retention means, then c) extracting from the mold, after cooling, the receptacle thus obtained.

It will be noted that this method is of the "IML" ("In Mold Labeling") type, the role of the label that is overmolded being in this instance performed by the flexible film, except that the whole surface of the flexible film is not secured to the retention means in order to allow the formation of the unfolding/uplifting means.

Figure 2:
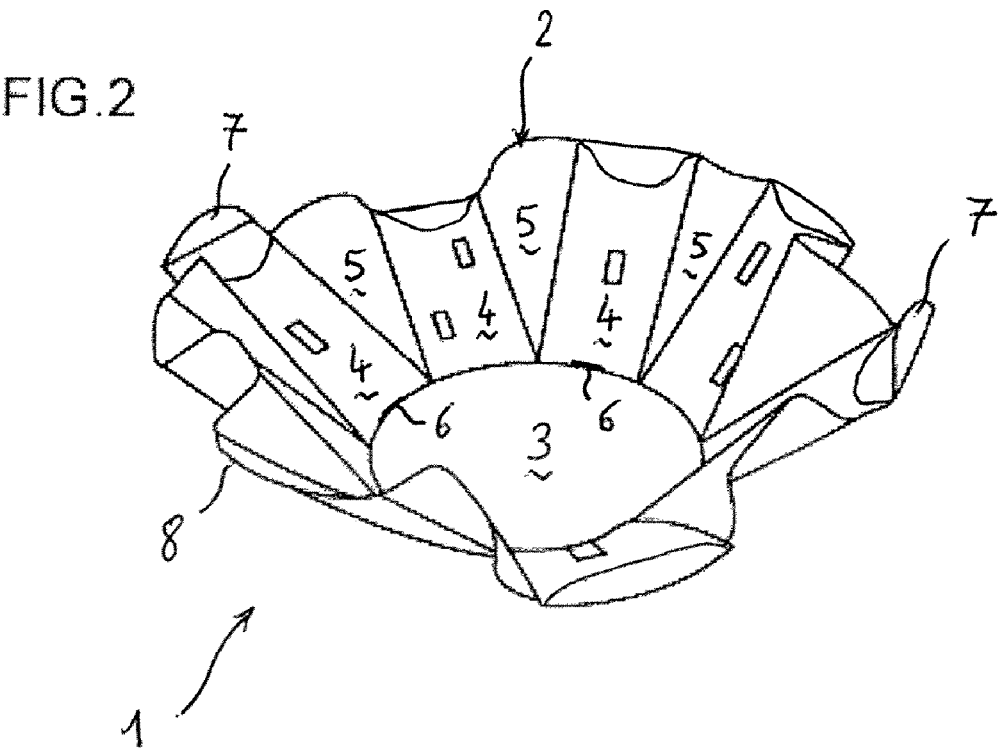
Figure 3:
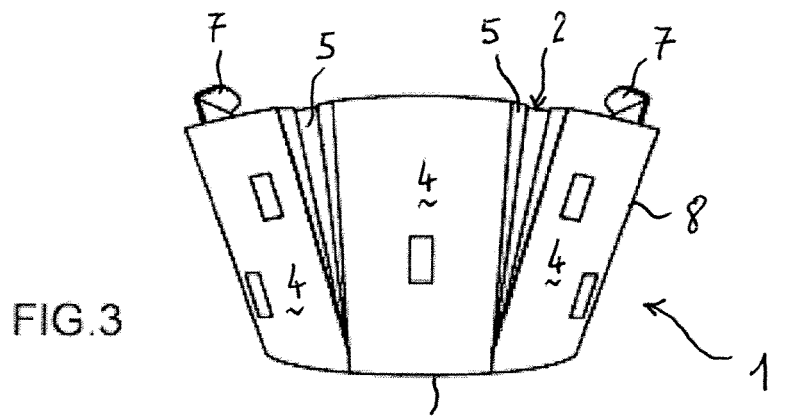
Figure 4:
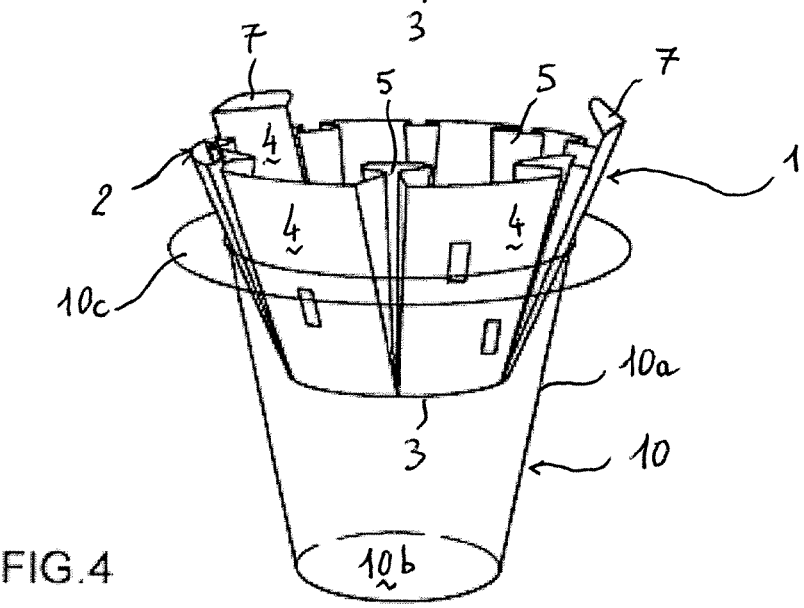
Figure 5:
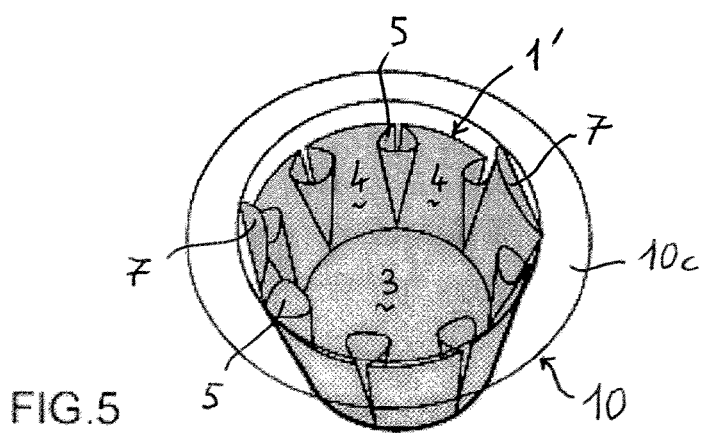
Figure 6:
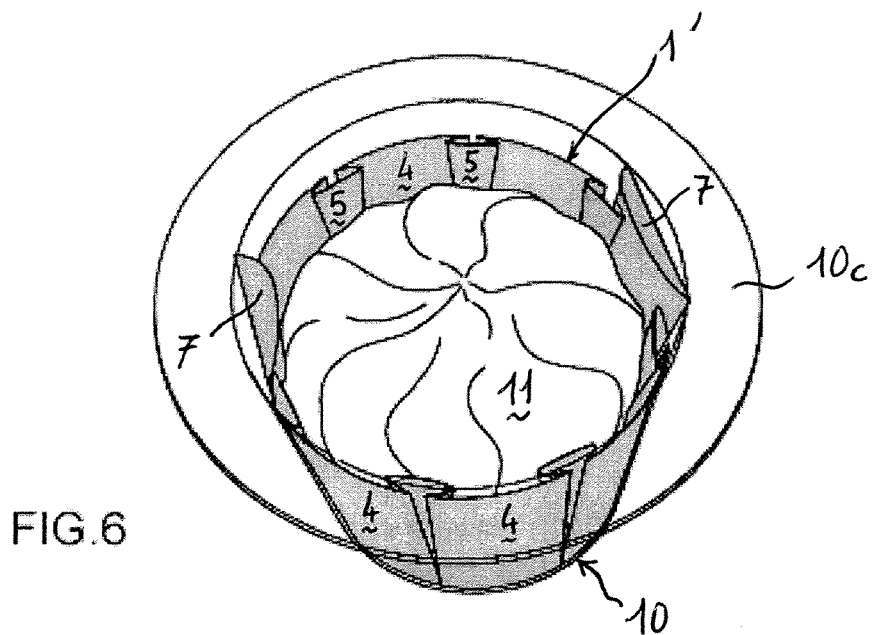
Figure 7:
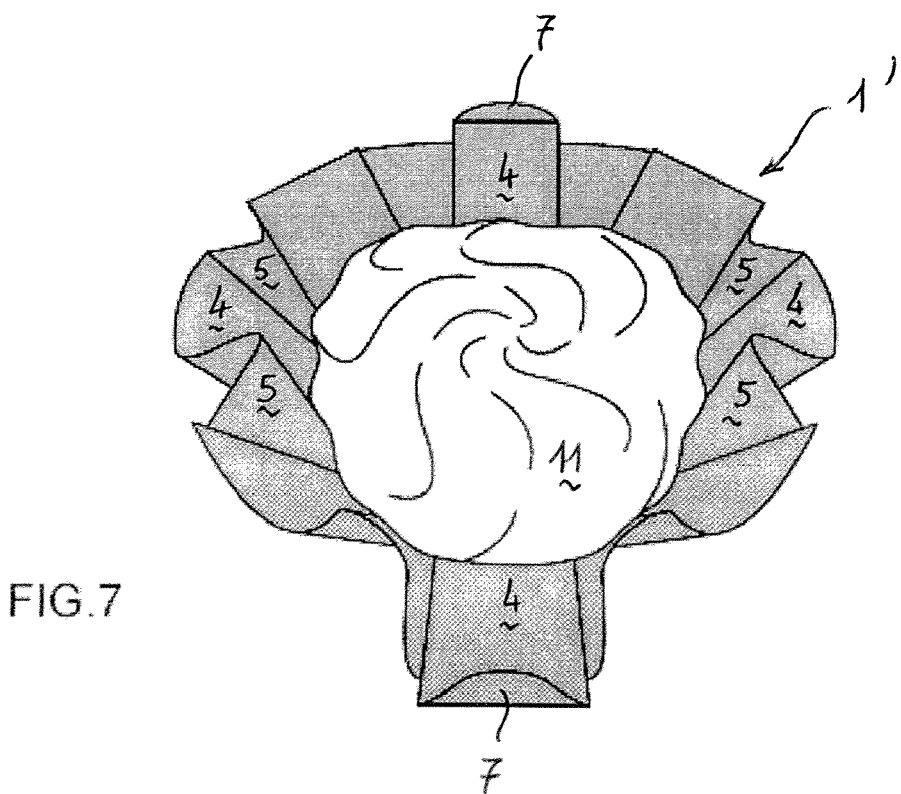

Other features, advantages and details of the present invention will emerge on reading the following description of several exemplary embodiments of the invention, given as an illustration and not being limiting, said description being produced with reference to the appended drawings amongst which:

FIG. 1 is a view from the top and in perspective of a perforated receptacle according to one exemplary embodiment of the invention, illustrated flat for the purpose of being delivered, FIG. 2 is a view in perspective of a receptacle according to a variant of FIG. 1 in an intermediate position of being uplifted in comparison with that of FIG. 1, FIG. 3 is a view from the side and in perspective of the receptacle of FIG. 2 in a final stable upright position, FIG. 4 is a view from the side and in perspective of the receptacle of FIG. 3 shown during insertion, in this upright position, in a rigid container designed to receive it while closely following its walls, FIG. 5 is a view from the top and in perspective of the container of FIG. 4 into which an unperforated receptacle according to the invention corresponding to a variant of FIGS. 2 and 3 has been fully inserted, FIG. 6 is a view from the top and in perspective of the container provided with the receptacle according to FIG. 5, into which a food product has been inserted, and FIG. 7 is a view from the top and in perspective of the receptacle containing the product of FIG. 6 after this receptacle has been extracted from the container and has then obtained its folded-down position.

The receptacle 1 according to FIGS. 1 to 3 has a hybrid structure alternating flexible and rigid portions, being formed of a flexible film 2 for example made of cloth, paper or other flexible material, that can be deformed and folded, which is secured by overmolding, on the one hand, to the inner face of a bottom 3 of the receptacle 1 (circular in this exemplary embodiment) and, on the other hand, to the respective inner faces of rigid laths 4 (oblong, numbering six in FIG. 1 and eight in FIG. 2) placed in star form around the bottom 3 and separated in twos from one another by unfolding/uplifting flexible zones 5, this film forming into bellows, in these preferred examples of the invention.

This overmolding is carried out by initially placing the film 2 in the bottom of an injection mold, followed by injecting onto this film 2 a rigid thermoplastic material (for example made of a polystyrene or polypropylene) designed to form the bottom 3 and these flexible zones 5 in order to make this film 2 adhere closely thereto, and then by extracting the receptacle 1 thus obtained from the mold after cooling. It will be noted that the film 2 may be made of a neutral or colored material, or a material even printed in the manner of a label, and that the thermoplastic material forming the laths 4 may have a large variety of colors and/or effects, such as for example a cream white color with a relief effect with wood-like veining that can be obtained by an etching of the mold, in a nonlimiting manner.

It will be noted that the materials used for the film 2 and for the laths 4 may vary in a large measure and are advantageously chosen to be compatible with good preservation of the product with which they are designed to be in contact, e.g. an unripened cheese or a cheese specialty.

In the example of FIGS. 1 to 3, the laths 4 are connected to the bottom 3 by articulations 6 forming hinges, which are each located preferably in a central portion of the bottom base 4a of this lath 4 so that these laths 4 are substantially tangential to the bottom 3, and the flexible film 2 extends laterally around each lath 4 and if necessary on either side of each articulation 6 in contact with the bottom 3.

In this exemplary embodiment, each lath 4 has perforations 4b designed to allow the outflow of an exudate or serum contained in the food product to be placed in the receptacle 1, such as an unripened cheese, for example, which recipient 1 then plays the role of a draining basket when it is inserted in a container 10 in the form of a pot designed to receive it for the draining of the product (see FIG. 4). As for the film 2, it may be chosen to be porous or perforated in determined zones, depending on the product to be placed in the receptacle 1, in order to absorb a portion of the serum expelled by the cheese or cheese specialty up to its optimal use-by date ("DLUO" in French) or its sell-by date ("DLV" in French). This optional permeability of the film 2 allows the serum to be carried away to the bottom of the container 10.

Moreover, several of these laths 4 (two laths 4 diametrically opposed in the example of these figures) are advantageously furnished at their top base 4c with means 7 for gripping the receptacle 1, said means being formed in this example of end flaps extending the laths 4 in a single piece while being folded toward the inside of the receptacle 1, which thus forms a sort of basket of which these flaps 7 make it easier to insert into the container 10 (see FIG. 4) and extract it from the latter. It will be noted that the receptacles 1 obtained following the molding can be stacked and delivered flat (see FIG. 1), the flaps 7 then all being oriented in the same direction.

The film 2 extends over the whole periphery of the side wall 8 of the receptacle 1 while being secured at regular intervals with the respective inner faces of the laths 4, bottom bases 4a of the latter at a short distance from their top bases 4c, in the example of FIGS. 1 and 2.

With reference to the folded-down position of FIG. 2 and to the upright position of FIG. 3, it can be seen that the bellows 5 formed by the film 2 can be bent in a reversible manner between two laths 4, while being deployed outward (virtually flat) in the folded-down position and conversely folded toward the inside of the receptacle 1 in the upright position, in which the laths 4 are thus almost touching. It will be noted that these laths 4 on their own make it possible to keep the receptacle 1 in this upright position of FIG. 3, which is thus self-supporting (its side wall 8 then has a slightly frustoconical geometry in this example).

FIG. 5 illustrates the positioning of another receptacle 1' according to the invention at the bottom of the container 10 of FIG. 4, in the upright position of this receptacle 1' which thus closely follows the side wall 10a (cylindrical or slightly frustoconical in this example) and if necessary the bottom 10b of this container 10 (a determined vertical space being able to be arranged between the bottom 3 of the receptacle 1' and this bottom 10b, for example for collecting a drainage liquid originating from the food product 11). FIG. 6 shows the result of the operation of measuring this product 11 into the receptacle 1', which is then closed by a lid or by any other means for the correct preservation of the product 11. In the case of a cheese, the latter may be measured out at a temperature for example of between 4° C. and 85° C., depending on the cheese-making technology employed.

As illustrated in FIG. 7, access is gained to the product 11 by initially extracting the receptacle 1' from the container via the gripping means 7 secured to this receptacle 1' which are level with or protrude from the rim 10c of the container 10, then the side wall 8 of the receptacle 1' is unfolded for example by pulling these gripping means 7 apart from one another, in order to obtain the folded-down position of this FIG. 7. The consumer can then conveniently take hold of the product 11 or cut it in a satisfactory manner while being assured that this product 11 is protected by the receptacle 1' even when unfolded, thanks to the laths 4 which oppose the total collapse of its side wall 8.

In a general manner, it should be noted that a receptacle 1, 1' according to the invention may be used without an outer container 10 receiving it and may be designed, by virtue of the available surface area of the flexible film 2, to package cheeses other than unripened cheeses such as, for example, soft cheeses, the unused top portion of the film 2 being able to be folded down to the top surface of the cheese like an envelope (this film 2 being chosen to have adequate porosity/permeability for the correct preservation of the cheese).

Finally, and as indicated at the beginning of the present description, it is possible to note that a receptacle according to the invention may be used to support all types of products which may be comestible or not and optionally prepackaged, even being able to include utility or decorative objects or articles, and that its geometry described above with reference to FIGS. 1 to 7 is only one example amongst others and could vary considerably depending on the nature and the dimensions of the product or products to be packaged.

The invention claimed is:

1. A packaging for a solid or pasty food product (11), comprising a receptacle (1, 1') supporting this product and a rigid container (10) receiving this receptacle in a removable manner, wherein the receptacle has a bottom and a side wall which extends from the bottom and which incorporates rigid wall retention means for keeping it in an upright position relative to the bottom, these rigid wall retention means being spaced over the periphery of the side wall while being connected together in twos by flexible means (5) for unfolding/uplifting this side wall which are formed by determined zones of at least one flexible film (2) and which allow for the reversible transition of this side wall from its upright position to a folded-down position in which it extends the bottom in a more fanned-out manner, wherein these retention means are secured to these unfolding/uplifting means by overmolding, these retention means and this bottom being formed of a same rigid thermoplastic material injected onto this flexible film and closely adhering to the retention means and bottom, the receptacle having its side wall that substantially matches the shape of the side wall of the container in said upright position and this receptacle being made of porous and/or perforated materials for the purpose of allowing the product to drain inside the container.

2. The packaging as claimed in claim 1, wherein said retention means (4) are formed by perforated rigid laths extending over the periphery of said side wall (8) in alternation with said unfolding/uplifting means (5), which are formed by at least one porous flexible film (2) extending over the whole periphery of said bottom (3) being secured at regular intervals to said laths.

3. A method for manufacturing a receptacle (1, 1') as claimed in claim 1, which method comprises an overmolding of said flexible unfolding/uplifting means (5) by said rigid retention means (4), this overmolding preferably being carried out by:
   a) placing on the bottom of a mold a flexible film (2), preferably made of paper, cloth, nonwoven or of deformable thermoplastic material, which is designed to locally form said unfolding/uplifting means,
   b) injecting onto this film at least one rigid thermoplastic material designed to form both said bottom (3) and laths (4) forming said retention means, in order to make this film closely adhere to this bottom and to these laths, then c) extracting from the mold, after cooling, the receptacle thus obtained.

4. The packaging as claimed in claim 2, wherein said unfolding/uplifting means (5) are attached to said adjacent laths (4) forming bellows that are folded inward in said upright position and which are deployed outward in said folded-down position.

5. The packaging as claimed in claim 2, wherein said unfolding/uplifting means (5) are formed of said flexible film (2), made of paper, cloth, nonwoven or of deformable thermoplastic material, which can be folded reversibly between two adjacent laths (4) and which extends over the whole periphery of said side wall (8) being secured at regular intervals to said laths.

6. The packaging as claimed in claim 5, wherein said flexible film (2) is secured to the respective inner faces of said adjacent laths (4), each or certain of them being articulated on said bottom (3) or else separated from the latter by this flexible film.

7. The packaging as claimed in claim 4, wherein each of said adjacent laths (4) has a bottom base (4a) articulated on said bottom (3) via an articulation (6) centered on this base, said flexible film (2) extending on either side of each articulation in contact with this bottom and with each adjacent lath.

8. The packaging as claimed in claim 2, which receptacle comprises gripping means (7) which are formed by the respective free ends (4c) of at least two, opposite, of said adjacent laths (4) on the periphery of said side wall (8).

9. The packaging as claimed in claim 1, wherein said bottom (3) has a circular or square geometry, so that this receptacle has substantially a shape of an open corolla in said folded-down position.

10. The packaging as claimed in claim 1, wherein the receptacle contains an unripened cheese or a cheese specialty as a solid or pasty food product.

* * * * *